July 10, 1923.

T. H. MARTEN

PROJECTION DEVICE

Filed May 6, 1922

1,461,133

Inventor.
Thomas H. Marten

Patented July 10, 1923.

1,461,133

UNITED STATES PATENT OFFICE.

THOMAS HENRY MARTEN, OF TORONTO, ONTARIO, CANADA.

PROJECTION DEVICE.

Application filed May 6, 1922. Serial No. 558,916.

*To all whom it may concern:*

Be it known that I, THOMAS HENRY MARTEN, a subject of the King of Great Britain, and resident of the city of Toronto, county of York, Province of Ontario, in the Dominion of Canada, have invented certain new and useful Improvements in a Projection Device, described in the following specification and illustrated in the accompanying drawings, that form part of the same.

The principal object of the invention is to devise an apparatus which will enable the projection of a secondary picture about the main picture for the purpose of creating and maintaining a flexible focal adjustment in the eye of the observer, such projection being accomplished in definite cooperation with the main projector.

The principal feature of the invention consists in the arrangement of a pair of projecting machines and in operating both projectors from the same source of light, means being interposed in the path of the light to the main projector adapted to periodically intercept and deflect the rays of light and providing means for directing such deflected rays to the secondary projector and effecting the alternation of the light from a common source to operate two projectors alternately on the screen.

Figure 1:
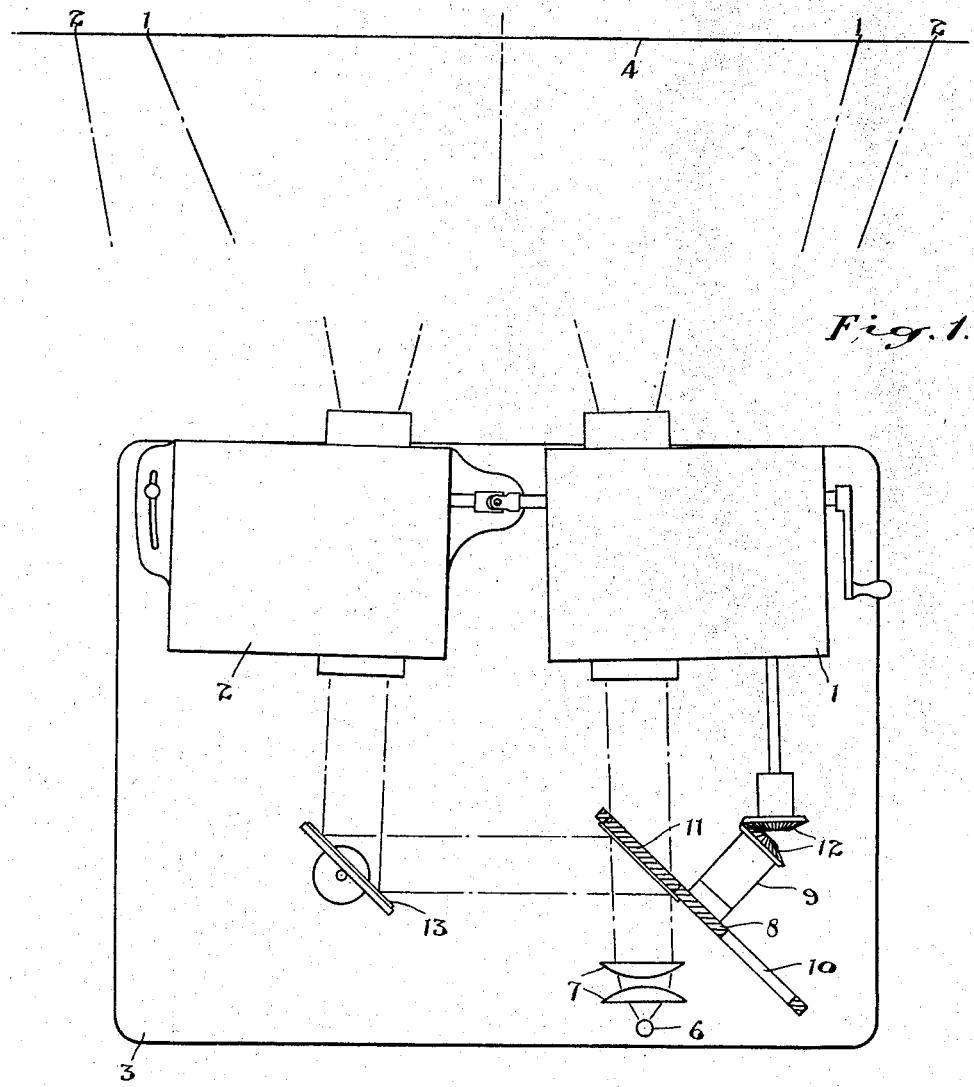

In the drawings, Figure 1 is a diagrammatic plan of a projector device arranged according to this invention.

Figure 2:
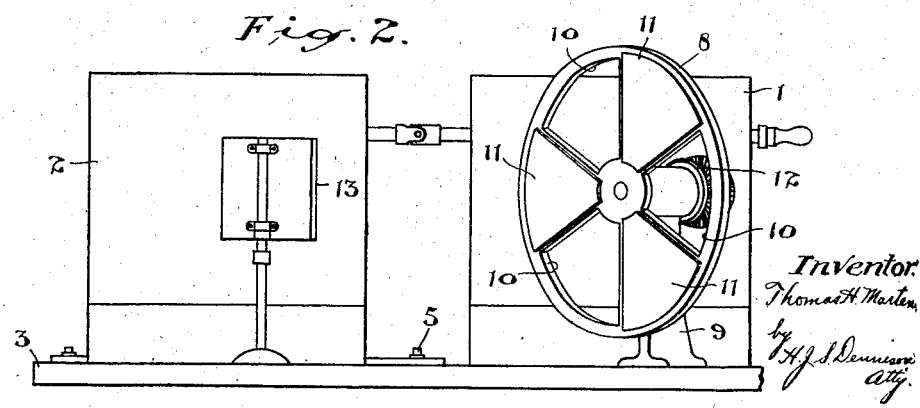

Figure 2 is an elevational view from the rear of Figure 1.

In my co-pending application, Serial Number 549,005 I have described a method of producing an effect of visual depth in projected pictures which is accomplished by locating upon the screen and about the main picture a secondary picture and this secondary picture creates and maintains a flexible focal adjustment in the eye of the observer so that it automatically adjusts itself to the varying conditions of depth or distance represented in the combined pictures and to accomplish such result requires special apparatus as two projections are needed and it is an important feature in connection with the projection that the operation be simplified so that there will be no need of any special skill on the part of the operator to accomplish the desired result and so that there will be no appreciable variation that would be objectionable to the public viewing the pictures.

In the diagram illustrated in the drawings a pair of projectors 1 and 2 are arranged close together on a suitable base 3 and the axes of the lenses are aligned to project to a central point on the screen 4.

The projector 2 is shown adjustable to accommodate any slight variations and it is arranged on a pivot 5 located centrally between the lenses of the two machines.

The source of light 6 is suitably located in line with the lenses of the projector 1, the beam preferably passing through the lenses 7 to suitably project the rays through the projector machine.

All projecting machines are provided with a revolving shutter having openings and blank spaces which shutter is revolved in unison with the film operating mechanism to intercept the light at certain definite periods to allow the movement of the film and to reduce or prevent flickering.

On the present apparatus I provide a revolving shutter to be located between the projector and the light source and this shutter 8 is in the form of a large disc mounted on a shaft supported in a standard 9, the shutter being located at an angle of 45 degrees to the axis of the beam of light and having one side intercepting the beam.

The shutter is formed with the openings 10 preferably three in number and between these are the blank spaces 11. The shutter is operably connected by suitable gearing 12 to the operating mechanism of the projector 1 and revolves in unison with the projector mechanism so that the blank spaces 11 shut off the beam of light, the beam passing through the openings 10 at the proper period when the film is stationary.

The blank spaces 11 are provided with reflecting surfaces, consequently when the blank space is in alignment with the beam of light the intercepted beam will be reflected in a transverse direction.

A reflecting surface 13 is placed in a suitable position to receive the transversely reflected beam and to reflect same through the secondary projector 2.

The result of this arrangement of means for intercepting the beam of light and directing it through the secondary projector is that the light which is otherwise inoperative in producing a picture is utilized in the secondary machine and consequently the secondary machine being operatively connected with the main projector is arranged to project its picture in the alternating periods of the main projector.

The picture used in the secondary machine is, according to my previous application such as to create a more or less subconscious focal activity, a distinct movement may be produced in the border picture which relieves the eye strain. This secondary projection also has the effect of maintaining a practically constant lighting effect on the screen, that is to say, there will be light transmitted to the screen by either one projector or the other. In other words, when the light is cut off from one machine it is instantaneously projected by the other though upon different areas.

In the diagram the main picture is represented on the screen 4 as extending between the points 1—1 and the secondary picture is a border picture extending from 1 to 2 and its width is variable.

It may be found desirable to utilize a moving film to project the secondary picture but the effect of a lighted area outside of the main picture may be obtained by stationary or any desirable form of transparency.

The principal feature is in utilizing a single source of light for the main picture and any outside illumination of the proscenium which may be desired through a separate lens. This result is accomplished without increasing the operating cost other than the slightly increased cost of the projector and the light which otherwise is wasted becomes a valuable addition to the lighting scheme of the auditorium.

It is a very important feature of this invention that the light projecting the main or central picture be without reflection so that there shall be no optical distortion of the picture.

What I claim as my invention is:—

1. A projection device, comprising, a pair of projectors, a fixed source of light, and means for directing the beam of light from said light source in alternating periods to both projectors.

2. A projection device, comprising, a pair of projectors, a source of light, means interposed in the path of the light to one projector to intercept and deflect the rays periodically to the other projector.

3. A projection device, comprising, a pair of projectors, a source of light, means interposed in the path of the light to periodically intercept and deflect the rays in passage to one projector, and means for directing the deflected rays through the other projector.

4. A projection device, comprising, a pair of projectors, a source of light arranged in alignment with one projector, means arranged between the source of light and the said projector operatively connected with said projector and adapted to periodically intercept and deflect the rays of light directed thereto, and means for directing the deflected rays through the other projector.

5. In a picture projector, a pair of projectors, a source of light directing its rays without reflection through one projector, a disc rotatably arranged to angularly intercept the path of the rays of light to said projector, said disc having a plurality of openings therethrough, reflecting surfaces disposed between the said openings adapted to deflect the rays of light from their passage to the said projector, a reflector adapted to receive the deflected rays and to project them through the other projector.

6. A projecting device, comprising, a pair of projectors, a source of light directing a beam into one projector, a rotatable disc arranged in angular relation to the beam of light and extending into the path thereof, said disc having openings and intervening blank spaces, means for rotating said disc so that the beam of light will be intercepted at the desired periods, reflecting surfaces arranged upon the blank spaces of said disc adapted to deflect the light transversely, and a reflector adapted to receive the deflected light and to direct same into the other projector.

THOMAS HENRY MARTEN.